(12) United States Patent
Runkel

(10) Patent No.: US 8,746,661 B2
(45) Date of Patent: Jun. 10, 2014

(54) HYDRO-PNEUMATIC PISTON ACCUMULATOR

(75) Inventor: Walter Runkel, Leubsdorf (DE)

(73) Assignee: Hemscheidt Fahrwerktechnik GmbH & Co. KG, Haan-Gruiten (DE)

( * ) Notice: Subject to any disclaimer, the term of this patent is extended or adjusted under 35 U.S.C. 154(b) by 615 days.

(21) Appl. No.: 12/841,423

(22) Filed: Jul. 22, 2010

(65) Prior Publication Data

US 2011/0042869 A1 Feb. 24, 2011

(30) Foreign Application Priority Data

Aug. 19, 2009 (EP) ..................................... 09168192

(51) Int. Cl.
*F16F 9/43* (2006.01)
*F16F 9/06* (2006.01)

(52) U.S. Cl.
USPC .................. 267/64.28; 267/64.11; 267/64.17; 267/64.25; 267/64.26; 267/119; 267/217; 267/218; 91/4 R; 91/5; 92/23; 92/108; 92/113; 92/165 R; 188/203; 188/269; 188/275; 188/297; 188/313; 188/314; 188/318; 188/322.19

(58) Field of Classification Search
USPC ...................... 267/64.28, 64.25, 64.26, 64.17, 267/218–221, 217; 188/319.2, 313–315; 60/413, 415; 92/109, 113, 165 R, 108; 91/4 R, 5; 138/31

See application file for complete search history.

(56) References Cited

U.S. PATENT DOCUMENTS

| 524,013 | A | * | 8/1894 | Worthington | 417/21 |
| 1,322,230 | A | * | 11/1919 | Dawson et al. | 89/43.01 |
| 1,625,751 | A | * | 4/1927 | Solberg | 92/117 R |
| 3,726,191 | A | * | 4/1973 | Johnston et al. | 92/5 R |
| 3,837,354 | A | * | 9/1974 | Farr | 137/118.06 |
| 5,400,880 | A | * | 3/1995 | Ryan | 188/314 |
| 2006/0180419 | A1 | * | 8/2006 | Lamoureux et al. | 188/318 |

FOREIGN PATENT DOCUMENTS

| DE | 38 39 446 A1 | 6/1989 |
| DE | 90 02 419 U1 | 11/1990 |
| DE | 20 2004 005623 U1 | 8/2005 |
| DE | 36 13 677 A1 | 10/2005 |
| EP | 1 000 782 A1 | 5/2000 |
| EP | 1 588 939 A1 | 10/2005 |

OTHER PUBLICATIONS

European Search Report—Jan. 20, 2010.

* cited by examiner

*Primary Examiner* — Robert A Siconolfi
*Assistant Examiner* — San Aung
(74) *Attorney, Agent, or Firm* — Brinks, Gilson & Lione

(57) ABSTRACT

The invention relates to a hydro-pneumatic piston accumulator (1), particularly for vehicle suspension systems, consisting of an accumulator housing (2) and a separating piston (6), which is disposed free-floating inside the accumulator housing in a displaceable manner in the direction of the movement axis (4). The separating piston separates an accumulator area (8) for a hydraulic medium from a pressure area (10) that is filled or is to be filled with a compressible medium, and is guided with an interior guide opening (30) on an elongated guide element (32), which is axially fixed within the accumulator housing (2).

18 Claims, 4 Drawing Sheets

HYDRO-PNEUMATIC PISTON ACCUMULATOR

CROSS REFERENCE TO RELATED APPLICATIONS

This application claims priority to European patent application number 09168192.4, filed Aug. 19, 2009.

FIELD OF THE INVENTION

The present invention relates to a hydro-pneumatic piston accumulator, particularly for vehicle suspension systems, that consists of an accumulator housing and a separating piston, which is disposed free-floating inside the accumulator housing in a displaceable manner in the direction of the movement axis, and which separates an accumulator area for a hydraulic medium from a pressure area that is filled or is to be filled with a compressible medium.

BACKGROUND OF THE INVENTION

The purpose of hydro-pneumatic pressure accumulators in suspension systems in motor vehicles is to function as a pneumatic spring and accumulate energy and release it when required. For this purpose, a telescopic suspension cylinder normally interacts with the pressure accumulator by means of hydraulic medium. During the deflection movement of the suspension cylinder, the compressible medium, particularly a gas, is compressed by the displaced hydraulic medium within the pressure accumulator, causing the pressure of the compressible medium to be increased. This increased pressure then serves to displace the hydraulic medium and return the suspension cylinder to its original position. Via the suspension cylinder, the subsequently achieved static pressure of the medium creates a lifting capacity that supports the related load.

Various accumulator designs are known. The hydraulic medium can, for example, act directly (without separation wall) against a gas. Accumulators without a separating wall such as this have the advantage that they lack any friction force and that the hysteresis is low. The disadvantage is, however, that during prolonged operating times the gas is absorbed by the pressure fluid. It is therefore practical to separate the hydraulic medium from the compressible medium by means of a displaceable separating wall. The separating wall can be configured as a bladder, a membrane or as a displaceable separating piston.

Membrane or bladder accumulators have the disadvantage that the flexible separating wall (plastic skin), which is particularly comprised of plastic, has the tendency to become brittle at low temperatures and can thus become damaged.

For this reason, piston accumulators of the earlier described type are frequently being used. Such a piston accumulator is disclosed in published application DE 36 13 677 A1, for example. It is an integrated embodiment, wherein the separating piston is arranged inside the hollow piston rod of a suspension cylinder. The accumulator housing is therefore in this case formed by the hollow piston rod.

A similar embodiment is also described in DE 38 39 446 A1.

An additional hydro-pneumatic piston accumulator is also described in DE 90 02 419 U1. It is a particularly specialized embodiment as a pressure converter, wherein the separating piston is designed with two differently sized effective pressure areas.

Piston accumulators of the generic type have the disadvantage that the piston must be relatively long in order to be guided inside of the accumulator housing without tilting. More specifically, the length of the separating piston must at least be equal to its approximate diameter. If the length of the separating piston is significantly less than its diameter, then the separating piston may tilt and stick. This effect is known as a "stick-slip-effect." The relatively great length of the separating piston can in particular be clearly seen in the item of DE 36 13 677 A1.

The object of the present invention is to improve a piston accumulator of the aforementioned type in such a manner that it can be constructed having a short and compact length, yet will still ensure positive use characteristics.

According to the invention, the advantages are achieved claim 1 in that the separating piston with its interior guide opening is guided on an elongated guide element, which is axially fixed inside the accumulator housing. The guide element is advantageously designed with a circular cross section and is positioned centered relative to the movement axis of the separating piston. Since the guide element has a small diameter, which is significantly smaller than the outer diameter of the separating piston, the effective guide length of the interior guide opening can also be significantly shorter. In this case as well, the guide length is approximately equal to the diameter of the guide opening and/or that of the guide element.

According to the invention, the separating piston is therefore dually guided inside the accumulator housing, first in its outer circumferential area, in that it has an outer circumferential gasket to seal a circumferential annular gap from a cylindrical interior wall of the accumulator housing, and second, in the area of the interior guide opening by means of the rod-shaped guide element. It is preferable that the external guide and the interior guide according to the invention are axially offset in relation to each other. This is preferably achieved by positioning the guide opening in the area of an axially protruding, hollow cylindrical guide abutment, said abutment being comprised of the relatively flat disc-shaped separating piston. In another preferable arrangement, the guide opening can be formed by a guide bushing, which is positioned inside the guide abutment and which encloses the guide element.

Further preferable arrangement characteristics of the invention are incorporated in the dependent claims as well as in the following description.

BRIEF DESCRIPTION OF THE DRAWINGS

Example embodiments of the invention will be further explained in more detail below on the basis of the included figures. Each of the FIGS. 1 through 4 shows an embodiment according to the invention of a cross section of the piston accumulator in a preferable combination with a cross section of a suspension cylinder.

DETAILED DESCRIPTION OF THE INVENTION

Figure 1:
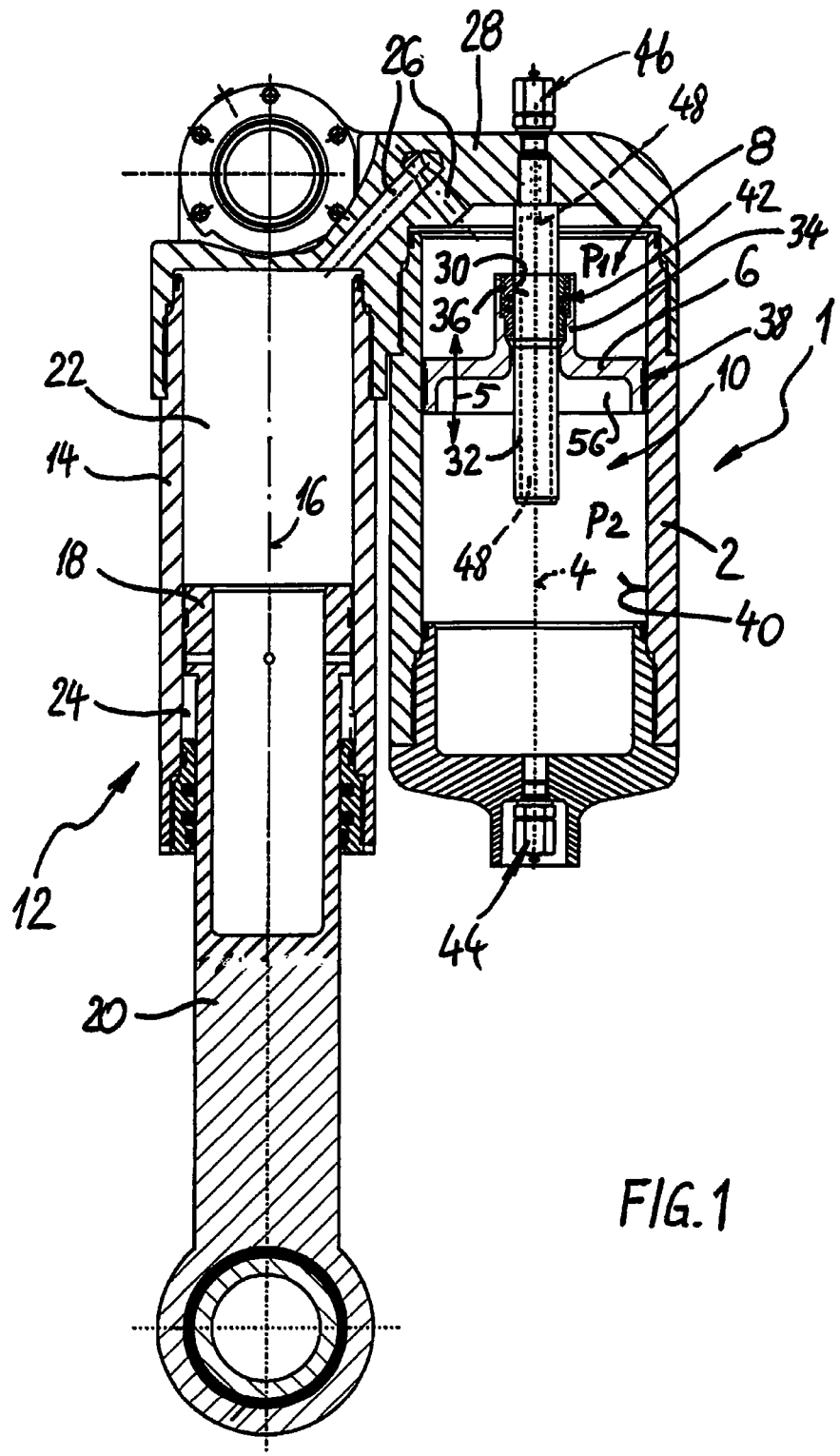

In the drawings, identical elements are assigned identical reference numerals and designations.

As can be seen from each of the drawing FIGS. 1 through 4, a hydro-pneumatic piston accumulator 1 according to the invention is comprised of a cylindrical accumulator housing 2 and a separating piston 6, said piston being free-floating within accumulator housing 2, i.e., freely displaceable in the direction of the movement axis (accumulator longitudinal axis 4) in the direction of the double arrow 5. Within the separating housing 2, the separating piston 6 separates an accumulator area 8 pressure-tightly from a pressure area 10.

In the preferred application for a vehicle suspension system the piston accumulator 1 interact with (at least) one hydraulic telescopic suspension cylinder 12. The suspension cylinder 12 is comprised of a cylinder 14 and a piston 18, which is displaced within the cylinder in the direction of the longitudinal axis 16 of the cylinder, with a circumferentially sealed piston rod 20 that is guided out of the cylinder 14. Within the cylinder 14, the piston 18 separates a cylinder area 22 from an annular area 24 that encloses the piston rod 20. Both areas 22 and 24 are filled with a hydraulic medium, while the suspension cylinder 12, in particular the cylinder space 22, is connected by means of a hydraulic connection 26 to the accumulator area 8 of the piston accumulator 1, which is also filled with the hydraulic medium. The hydraulic medium within the accumulator area 8 is under pressure $p_1$. The opposing pressure area 10 above the separating piston 6 is filled with a compressible medium, which is under pressure $p_2$. A gas, particularly nitrogen, is used as compressible medium. The separating piston 6 is displaced within the areas 8 and 10 by means of pressure and/or volume of the medium until pressure equilibrium is achieved at a static level.

In a preferable arrangement, the accumulator housing 2 of the piston accumulator 1 is mechanically firmly connected to the suspension cylinder 12, in particular in a mutually parallel position relative to their longitudinal axes 4 and 16. The piston accumulator 1 as well as the suspension cylinder 12 can comprise a common, particularly one-piece housing component 28, wherein the hydraulic connection 26 can be formed by at least one channel that extends through the housing component 28. In this preferred embodiment, the piston accumulator 1 and the suspension cylinder 12 are therefore combined into a common hydro-pneumatic suspension unit.

According to the present invention, it is provided for the piston accumulator 1 that the separating piston 6 comprises an internal axial and centric guide opening 30, which allows it to be axially displaced in a tilt-free manner on an elongated rod- or pin-type guide element 32 that is fastened within the accumulator housing 2. The separating piston 6 will be adequately guided by this guide element 32 even at short axial overall lengths to avoid the so-called "stick-slip-effect," i.e. a tilting against the longitudinal axis 4. The separating piston 6 can thus be short and relatively flat and disc-shaped.

The guide opening 30 is preferably positioned in the area of a hollow cylindrical guide abutment 34, which protrudes axially from the separating piston 6. It is furthermore advantageous to form the guide opening 30 by means of a separate guide bushing 36, which encloses the guide element and which is positioned within the preferably provided guide abutment 34. The guide bushing 36 is comprised of appropriate material to match the guide element 32 in such a manner that the axial movements of the separating piston 6 are smooth with minimal sliding friction.

In any case, the separating piston 6 has an external circumferential seal 38 to seal a circumferential annual gap from a cylindrical interior wall 40 of the accumulator housing 2. The external seal 38 can preferably consist of at least two axially spaced sealing rings. The external circumferential seal 38 also assists in providing guidance within the accumulator housing 2 in the external circumferential area of separating piston 6. In doing so, this circumferential guide area is axially offset with respect to the internal guide of the invention, in the area of the guide opening 30, which encloses the guide element 32. This causes a particularly effective guidance for the separating piston 6.

As an option, the separating piston 6 can also comprise an interior circumferential seal 42 in the area of the guide opening 30 in order to seal an annular gap between the separating piston 6 and/or the guide opening 30 and the guide element 32. This applies in particular to the embodiment according to FIG. 1, where the guide element 32 extends through the guide opening 30 of the separating piston 6 and is positioned in the accumulator area 8 and in the pressure area 10. The internal circumferential seal 42 and, in combination therewith, the external circumferential seal 38 achieve a separation between the accumulator area 8 and the pressure area 10. The pressures $p_1$ and $p_2$ here act on equally sized pressure areas of the separating piston 6 so that $p_1$ is always equal to $p_2$. The internal circumferential seal 42 can also preferably comprise at least two axially spaced sealing rings.

The guide element 32 is in all cases fixed at one end inside the accumulator housing 2 and freely extends at its other end axially into the interior area of the accumulator housing 2. The attachment can either be accomplished on the side of the accumulator area 8 (FIGS. 1, 3 and 4) or on the side of the pressure area 10 (FIG. 2).

In the embodiment according to FIG. 1, the guide element 32 is, for example, only fixed at the side of the accumulator area 8. For filling the pressure area 10 with the compressible medium, the accumulator housing 2 can comprise a filling connection 44, which is particularly designed as a filling valve, at the front side of the pressure area 10. Alternatively or additionally, the filling connection 46 can be positioned at the opposite front side of the accumulator housing 2, i.e. at the side of the accumulator area 8, wherein this filling connection 46 is also configured as a filling valve and is furthermore connected with the pressure area 10 through a channel 48, which extends axially through the guide element 32.

At variance from FIG. 1, the guide element 32 may also be only fixed to the side of the pressure area 10 or be fixed at both ends inside the accumulator housing.

Figure 2:
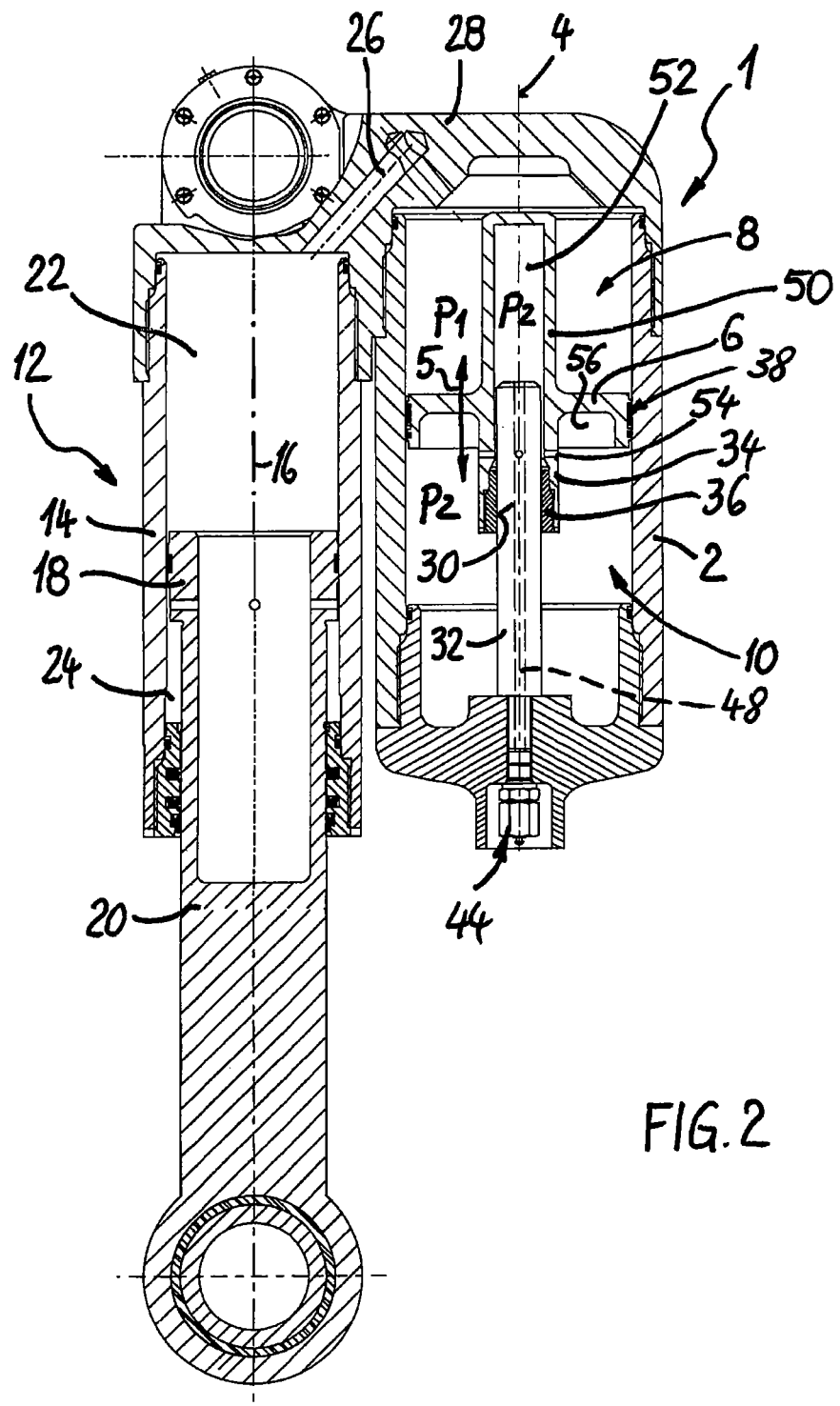
Figure 3:
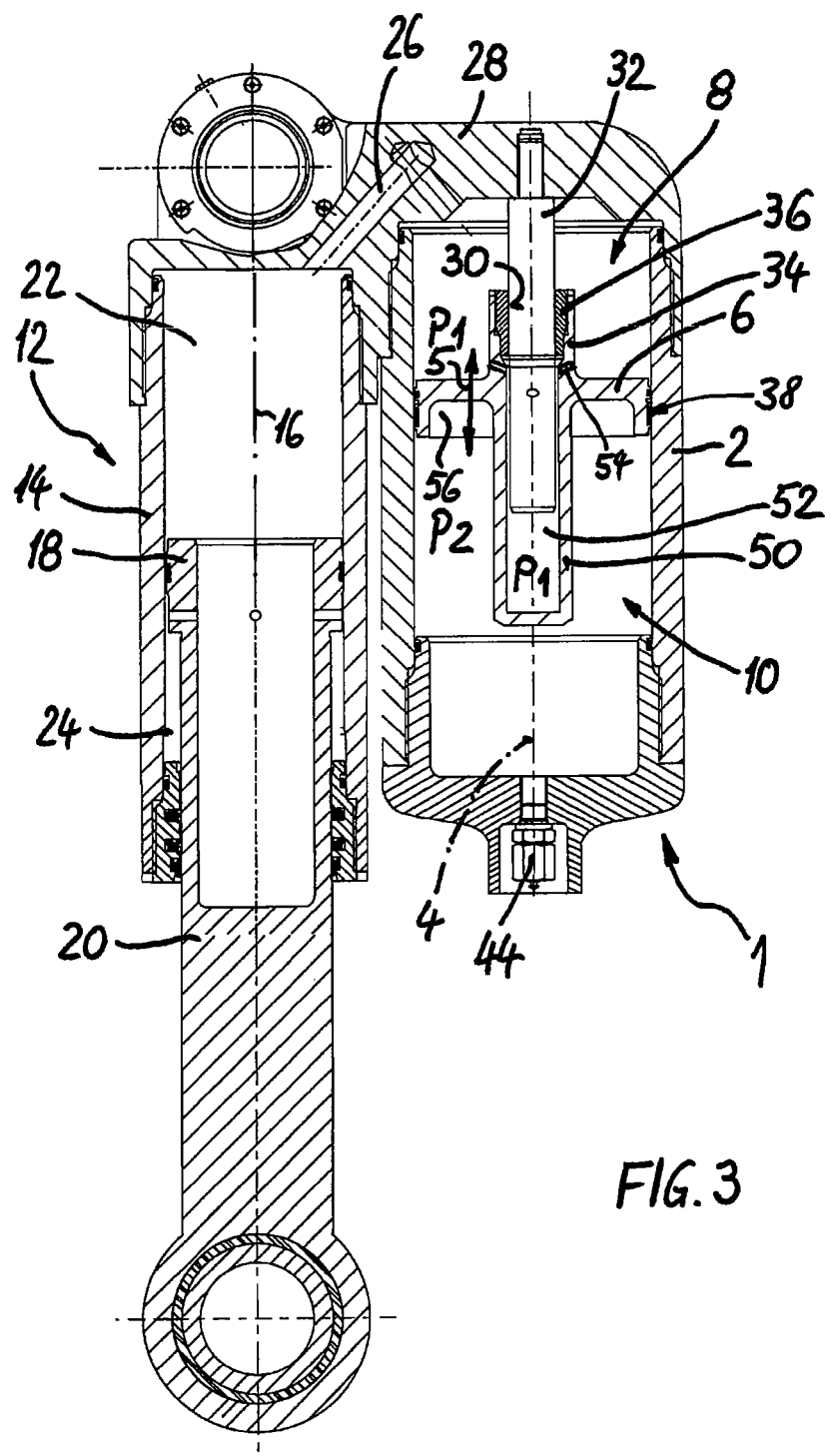
Figure 4:
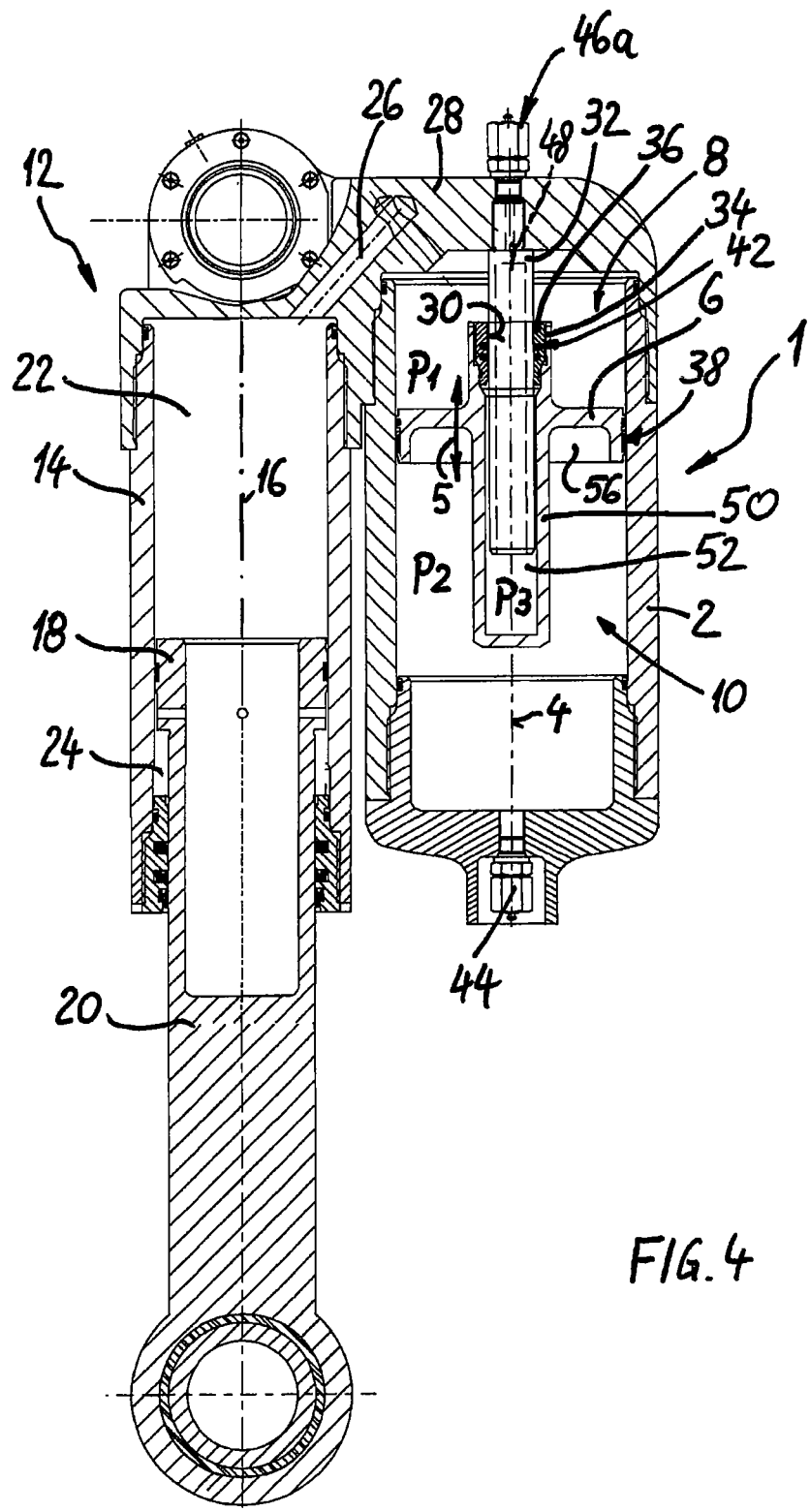

In the preferred embodiments according to FIGS. 2-4, the separating piston 6 comprises, on its side axially facing the projecting guide abutment 34, an axial abutment 50, hollow-cylindrical and closed at one end, with a cavity 52 that is closed at one end in the manner of a blind hole and adjoins the guide opening 30, for receiving a free end area of the guide element 32 running through the guide opening 30. In the displacements of separating piston 6, the guide element 32 therefore dips to a greater or lesser extent into the cavity 52. The cavity 52 may also be specified as a "deep hole bore". Since the hollow cylindrical abutment 50 that originates from the separating piston 6 is closed at the end, the interior circumferential seal 42 is not particularly required to separate the areas 8 and 10 from one another. For this reason the interior circumferential seal 42 in the area of the guide opening 30 is omitted in the embodiments according to FIGS. 2 and 3.

In the embodiment according to FIG. 2, where the guide element 32 is only fixed at one end on the side of the pressure area 10, the abutment 50 with the cavity 52 consequently extends into the accumulator area 8. The filling connection 44 is also connected here to the pressure area 10 by means of the channel 48 that extends through the guide element 32. However, the channel 48, which extends axially through the guide element 32 up to its free end, opens into the cavity 52 of the abutment 50 of the separating piston 6, wherein the separating piston 6 comprises at least one cross opening 54, starting from the cavity 52 and opening into the pressure area 10, particularly in the area of the hollow cylindrical guide abutment 34 axially between the separating piston 6 and the guide opening 30 and/or the guide bushing 36. The cavity 52 is thus also filled with the compressible medium, consequently resulting in the same effective pressure $p_2$. The hydraulic volume of accumulator area 8 is decreased in this embodiment, while the overall volume of the compressible medium of the pressure area 10 is increased throughout the cavity 52. This results in relatively flat and soft suspension characteristics.

The embodiments according to FIGS. 3 and 4 are in this respect reversed in that the guide element 32 is only fixed on one side of the accumulator area 8 and as a result the abutment 50 with the cavity 52 extends into the pressure area 10. According to FIG. 3 the cavity 52 is connected through at least one cross opening 54 of the separating piston 6 to the accumulator area 8 and consequently filled with the hydraulic medium so that the pressure $p_1$ is also effective in the cavity 52. The overall volume of the compressible medium in this embodiment is reduced within the pressure area 10, resulting in relatively steeper and harder suspension characteristics.

Regarding the embodiment according to FIG. 4, the cavity 52 that is formed in the separating piston-abutment 50 is separated with regard to the pressure from the pressure area 10 as well as from the accumulator area 8. This embodiment also makes the interior circumferential seal 42 in the area of the guide opening 30 necessary. In addition the cavity 52 is filled with a compressible medium, for which a filling connection (filling valve) 46a through the axial channel 48 of the guide element 32 opens into the cavity 52. Thereby a pressure $p_3$ can be adjusted within the cavity 52 that changes each time during the movements of the separating piston 6, while the guide element 32 dips to varying extents into the cavity 52, whereby its interior volume is changed from compression or expansion relative to the changing pressure $p_3$. As shown dashed in FIG. 4, channel 48 of the guide element 32 can be expanded toward the free end to enlarge the interior volume. This applies analogously also to the embodiment according to FIG. 1. This volume expansion aids in creating softer and flatter characteristics regarding the volume changes of the compressible medium. During the suspension-related movements of the separating piston 6 according to FIG. 4, the pneumatic pressures $p_2$ in the pressure area 10 and $p_3$ in the cavity 52 are changed in an opposed manner, i.e. when $p_2$ increases due to compression then $p_3$ decreases due to expansion and the same in reverse. In this, $p_3$ acts in the direction of the hydraulic pressure $p_1$ and thus against $p_2$. Therefore, $p_3$ supports the hydraulic pressure $p_1$; the same equation $p_2 = p_1 + p_3$ always applies. In this embodiment according to FIG. 4 the overall suspension characteristics can be affected by specifying the pressure $p_3$.

It is further preferable if the separating piston 6 at the side of the pressure area 10 comprises a depression 56 that enlarges the volume of the pressure area.

It must be stated in closing that the damping means for damping the hydraulic flow, not shown, can be positioned in the hydraulic connection 26 between the suspension cylinder 12 and the accumulator area 8 of the piston accumulator 1. Alternatively or additionally it is possible that the cylinder area 22 and the ring area 24 of the suspension cylinder 12 are hydraulically connected to one another by means of a damping means, likewise not shown, that is positioned in the area of the piston 18.

This invention is not limited to the illustrated and described embodiments but rather includes all embodiments acting identically in the spirit of the invention. Furthermore, the invention thus far is not limited to the combination of characteristics as defined in claim 1 but it can also be defined by any other appropriate combination of certain characteristics of all disclosed individual characteristics. That means that basically any individual characteristic of claim 1 can be omitted and/or replaced with at least one individual characteristic disclosed at a different place of the application. Claim 1 shall in this respect only be understood as a first attempt at articulating an invention.

The invention claimed is:

1. A hydro-pneumatic piston accumulator (1) for vehicle suspension systems, comprising an accumulator housing (2) and a separating piston (6) which is disposed free-floating inside the accumulator housing (2) in a displaceable manner in a direction of a movement axis (4), and which separates an accumulator area (8) for a hydraulic medium from a pressure area (10) that is filled or is adapted to be filled with a compressible medium, the separating piston (6) having a guide opening (30) receiving an elongated guide element (32), the separating piston (6) being guided for axial motion on the elongated guide element (32), which is axially fixed within the accumulator housing (2), the separating piston (6) having an axial abutment (50) with a blind-hole-type cavity (52) which extends from the guide opening (30), to receive a free end section of the guide element (32) that is guided through the guide opening (30), wherein the pressure in the accumulator area and the pressure in the pressure area act in opposite directions on equally sized pressure areas of the separating piston (6) and are equal to each other while the separating piston is in an equilibrium.

2. A piston accumulator according to claim 1, further comprising that the guide opening (30) is positioned in an area of a hollow cylindrical guide abutment (34) which protrudes axially from the separating piston (6) and is formed by a guide bushing (36) that encloses the guide element (32).

3. A piston accumulator according to claim 1, further comprising that the separating piston (6) has an outer circumferential seal (38) to seal a circumferential annual gap from a cylindrical interior wall (40) of the reservoir housing (2).

4. A piston accumulator according to claim 1, further comprising that, in the area of the guide opening (30), the separating piston (6) has an interior circumferential seal (42) in order to seal an annular gap between the separating piston (6) and the guide element (32).

5. A piston accumulator according to claim 1, further comprising that the accumulator housing (2) on the side of the pressure area (10) has a filling connection (44) for filling with the compressible medium.

6. A piston accumulator according to claim 1, further comprising that the guide element (32) is fixed in the accumulator housing (2) at one end on the side of the pressure area (10).

7. A piston accumulator according to claim 5, further comprising that the filling connection (44) is connected to the pressure area (10) by means of a channel (48) that extends through the guide element (32).

8. A piston accumulator according to claim 7, further comprising that the channel (48) which extends axially through the guide element (32) up to its free end, opens into the cavity (52) of an abutment (50) of the separating piston (6), wherein the separating piston (6) forms at least one cross opening (54), which originates from the cavity (52) and opens into the pressure area (10).

9. A piston accumulator according to claim 1, further comprising that one end of the guide element (32) is fixed in the accumulator housing (2) to the side of the accumulator area (8).

10. A piston accumulator according to claim 9, further comprising that a cavity (52) that is formed in a separating piston-abutment (50) is connected to the accumulator area (8) through at least one cross opening (54) of the separating piston (6).

11. A piston accumulator according to claim 9, further comprising that a cavity (52) that is formed in the separating piston-abutment (50) is filled or is adapted to be filled with the compressible medium and is separated in terms of pressure from the pressure area (10) as well as from the accumulator area (8).

12. A piston accumulator according to claim 11, further comprising that the accumulator housing (2) on the side of the accumulator area (8) comprises a filling connection (46a) for filling the compressible medium into the separating piston cavity (52), wherein the filling connection (46a) is connected to the cavity (52) by means of a channel (48) that extends through the guide element (32).

13. A piston accumulator according to claim 12, further comprising that the channel (48) of the guide element (32) is expanded toward the cavity (52) to enlarge the interior volume of the pressure area.

14. A piston accumulator according to claim 1, further comprising that the accumulator area (8) is connected to a hydraulic suspension cylinder (12) by means of a hydraulic connection (26), wherein the accumulator housing (2) is connected to the suspension cylinder (12) in a mutually parallel arrangement relative to their longitudinal axes (4, 16).

15. A piston accumulator according to claim 14, further comprising that the suspension cylinder (12), has a cylinder (14) and a piston (18) that is displaceable therein with a piston rod (20) that extends to the outside, wherein the piston (18) separates a cylinder area (22) from a ring area (24) that encloses the piston rod (20), and wherein the cylinder area (22) is connected to the accumulator area (8).

16. A piston accumulator according to claim 14, further comprising that damping means are positioned in the hydraulic connection (26) between the suspension cylinder (12) and the accumulator area (8) to damp the flow of the hydraulic medium.

17. A accumulator according to claim 15, further comprising that the cylinder area (22) and the ring area (24) are hydraulically connected to one another through damping means positioned in the area of the piston (18).

18. A accumulator according to claim 1, wherein the axial guide opening (30) is arranged on a first axial side of the separating piston (6) and an axial blind-hole cavity (52) extends from the axial guide opening to a closed end on a second axial side of the separating piston (6), the blind-hole cavity (52) having an internal pressure adjacent the closed end that is equal to the pressure on the axial side of the guide opening (30).

* * * * *